United States Patent [19]

Takahashi

[11] Patent Number: 4,484,115
[45] Date of Patent: Nov. 20, 1984

[54] BRUSHLESS MOTOR

[75] Inventor: Yoshiteru Takahashi, Yamakita, Japan

[73] Assignee: Fuji Photo Film Co., Ltd., Kanagawa, Japan

[21] Appl. No.: 392,468

[22] Filed: Jun. 28, 1982

[30] Foreign Application Priority Data

Jul. 14, 1981 [JP] Japan .............................. 56-110170

[51] Int. Cl.³ ...................... H02K 29/02; H02K 23/00
[52] U.S. Cl. .................................... 318/254; 318/138;
318/139; 318/439; 318/244; 318/245; 318/721;
318/722
[58] Field of Search ............... 318/254, 138, 439, 738,
318/695, 733, 789, 244, 245, 721, 722, 723, 254
A, 336–346

[56] References Cited

U.S. PATENT DOCUMENTS

| | | | |
|---|---|---|---|
| 3,096,467 | 7/1963 | Angus et al. ......................... | 318/138 |
| 3,418,550 | 12/1968 | Kolatorowicz et al. ............ | 318/138 |
| 3,538,407 | 11/1970 | Wenk .................................... | 318/138 |
| 3,771,036 | 11/1973 | Roggero ........................ | 318/439 X |
| 3,930,190 | 12/1975 | Liska ................................ | 318/254 A |
| 4,051,417 | 9/1977 | Fujinawa et al. .................... | 318/138 |
| 4,135,120 | 1/1979 | Hoshimi et al. ................ | 318/721 X |
| 4,283,664 | 8/1981 | Ebert ............................ | 318/254 A X |
| 4,292,575 | 9/1981 | Kühnlein et al. ............... | 318/254 A |
| 4,404,485 | 9/1983 | Ban et al. ........................ | 318/439 X |

FOREIGN PATENT DOCUMENTS

| | | | |
|---|---|---|---|
| 166495 | 12/1980 | Japan .................................... | 318/254 |
| 19395 | 2/1981 | Japan .................................... | 318/254 |
| 58790 | 5/1981 | Japan .................................... | 318/254 |

Primary Examiner—J. V. Truhe
Assistant Examiner—Paul Shik Luen Ip
Attorney, Agent, or Firm—Gerald J. Ferguson, Jr.; Joseph J. Baker

[57] ABSTRACT

A brushless motor comprising seven or more armature windings mounted on a stator, a field magnet mounted on a rotating shaft to rotate therewith with respect to the armature windings, a plurality of semiconductor commutating devices, each being connected to one of the armature windings, and Hall sensors for detecting the polarity of magnetic fields immediately opposite the windings. Each commutating device controls the direction of the electric current to be fed to its respective armature winding, according to the magnetic polarity detected by the Hall sensors. The armature windings are connected together at one end thereof and are connected to respective commutating devices at the other ends thereof.

4 Claims, 13 Drawing Figures

BRUSHLESS MOTOR

BACKGROUND OF THE INVENTION

1. Field of the Invention

This invention relates to a brushless motor, and more particularly to a brushless motor having seven or more armature windings.

2. Description of the Prior Art

An electric motor used in electronic computer systems or other precision instruments preferably has a large number (e.g. seven or more) of armature windings in order to obtain a constant rotational frequency (R.P.M.). Further, for such applications, brushless type motors are preferred over commutator type motors because the former has a longer life than the latter as well as being free from various problems inherent to the latter. For example, in commutator type motors, the commutator gradually wears down due to friction thereby producing brush dust which may cause various problems in the system which it is being used in. Although conventional brushless motors do away with the above mentioned drawbacks, brushless motors having a relatively large number of armature windings also have the disadvantage that they can develop very little starting torque.

This is because only a few of the armature windings can be simultaneously energized in conventional brushless motors as will be described in more detail hereinafter with reference made to the accompanying drawings.

SUMMARY OF THE INVENTION

The primary object of the present invention is to provide a brushless motor having seven or more armature windings in which a substantial number of armature windings can be simultaneously energized, thereby producing a relatively large torque compared with conventional brushless motors having the same number of windings.

In accordance with the present invention, there is provided a brushless motor comprising seven or more armature windings mounted on a stator, field magnets mounted on a rotating shaft to rotate therewith respect to the armature windings, and a plurality of semi-conductor commutating devices each being connected to one of the armature windings and having position detecting elements which detect the part of the magnetic field of the field magnet directly opposite to each armature winding, said each commutating device controlling the direction of the electric current to be fed to a respective armature winding according to the polarity of the magnetic fields detected by said position detecting elements, characterized in that said armature windings are connected together at one end thereof and the other ends of which connect to respective commutating devices.

DETAILED DESCRIPTION OF THE INVENTION

Figure 1:
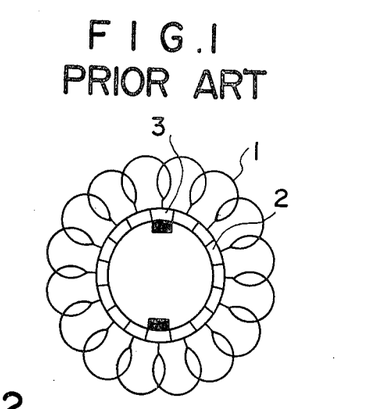
FIG. 1 is a schematic view showing the connection of the armature windings of a commutator motor having more than six armature windings.

FIG. 1 shows an example of a conventional commutator motor having more than six armature windings. The motor shown in FIG. 1 is of the closed circuit singly re-entrant simplex winding type. Reference numerals 1, 2 and 3 indicate armature windings, commutators and brushes, respectively. There are also commutator motors of a singly re-entrant duplex winding type and of a multiply re-entrant duplex winding type.

Figure 2:
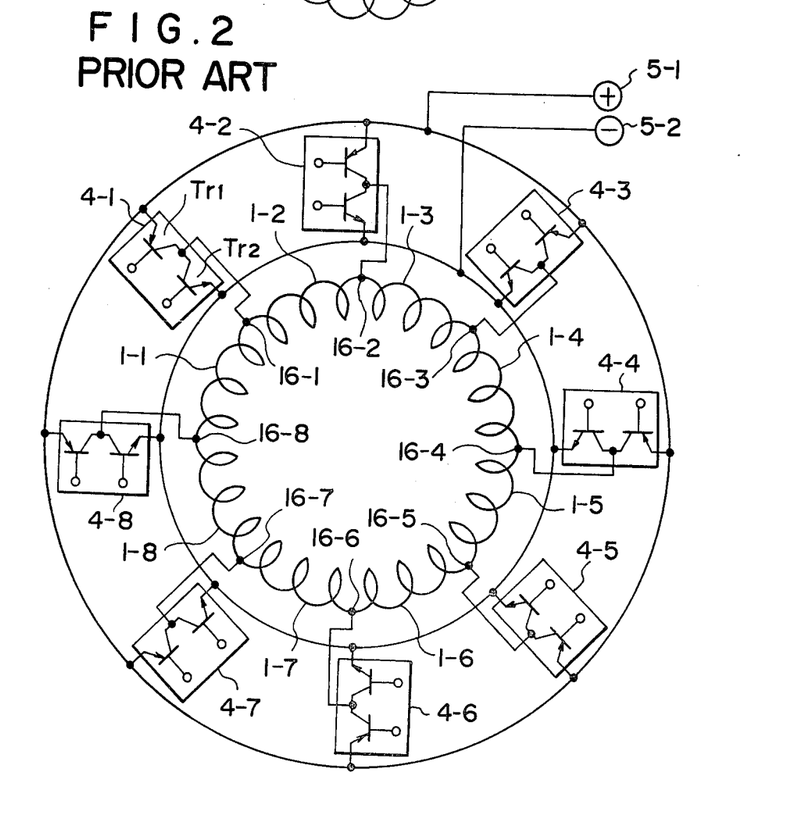
FIG. 2 is a schematic view showing the connections of the armature windings of a conventional brushless motor having eight armature windings.

FIG. 2 shows a schematic electric circuit of an example of a conventional brushless motor having more than six armature windings. The motor shown in FIG. 2 has eight armature windings 1 (1-1, 1-2, 1-3 ... 1-8). Each of the armature windings is connected to a positive and a negative power terminals 5-1 and 5-2 through commutating circuits 4 (4-1, 4-2 ... 4-8) connected to respective junction points 16 (16-1, 16-2 ... 16-8) between adjacent two armature windings. The commutating circuits 4 are semiconductor commutating devices of the "B" class push-pull type amplifiers, each having a pair of transistors Tr1 and Tr2. One of the commutating circuits 4 is shown in more detail in FIG. 3.

Figure 5:
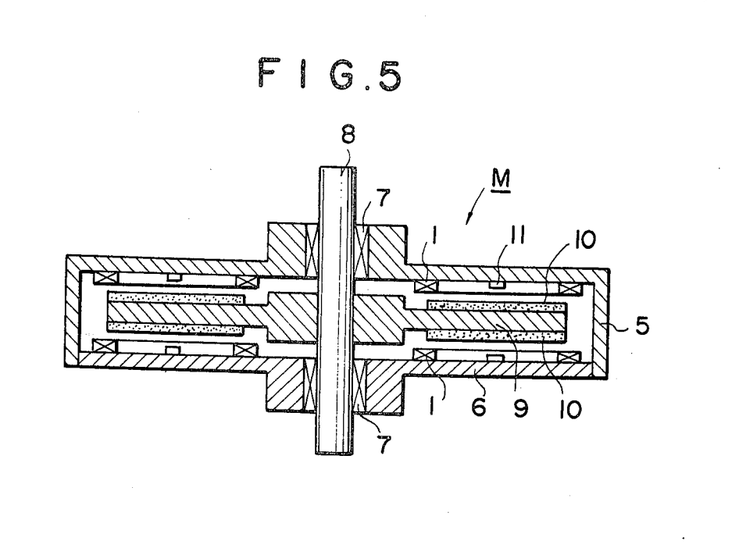
FIG. 5 is a cross sectional view showing a mechanical arrangement of an axially flat type brushless motor.
Figure 6:
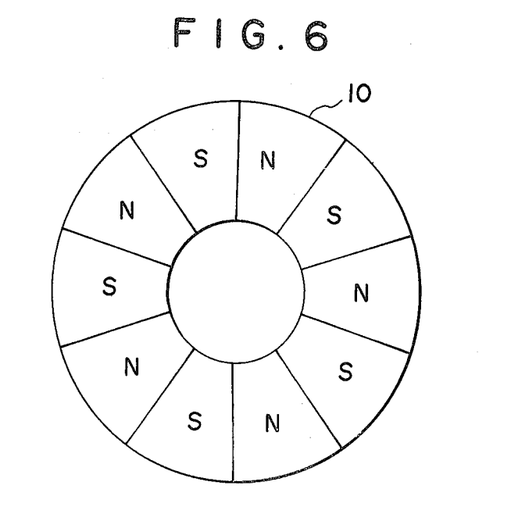
FIG. 6 is a schematic plan view showing the parts of the magnetic field of the motor shown in FIG. 5.

FIG. 5 shows the mechanical arrangement of an example of a brushless motor employing the electric circuit shown in FIG. 2. As shown in FIG. 5, the brushless motor M is an axially flat type motor and includes a motor body formed in a shallow cup-like open-bottom casing 5 and a disk-like soft steel plate 6 press-fitted into the open bottom of the casing 5. The casing 5 may be press-molded from soft steel. A pair of bearings 7 are mounted in an aperture in the casing 5 and in an aperture in the plate 6, respectively, at the center portion thereof. A rotating shaft 8 is rotatably supported by the bearings 7. An annular yoke 9 made of a suitable material such as soft steel is fixedly mounted onto the rotating shaft 8. On the upper and lower sides of the annular yoke 9 are bonded field magnets 10 wherein the same number of S poles and N poles are alternately mounted thereon. In this particular example, the number of S poles and N poles is five each as shown in FIG. 6. Each pole is fan shaped and the poles are positioned at 36° from each other.

Figure 7:
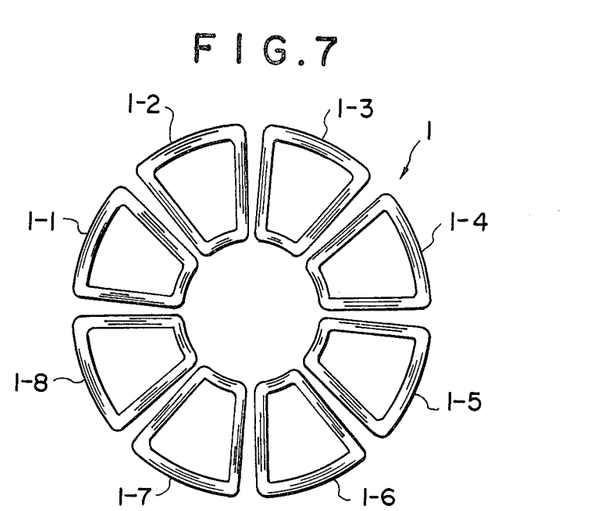
FIG. 7 is a schematic plan view showing an arrangement of the armature windings employed in the motor shown in FIG. 5.

The eight armature windings (1-1 to 1-8) are attached to the inner surface of the casing 5 and the soft steel plate 6. The armature windings 1-1 to 1-8 are shaped in a flat, fan like form and are equally spaced from each other so as not to overlap one another as shown in FIG. 7. Each flat coil is formed by winding a conductor a number of turns in a fan-shaped line so that the radially extending portions thereof form an angle substantially equal to said 36° at which the poles are positioned. A turning torque occurs due to the magnetic field developed between the individual poles of the field magnets 10 and the radially extending portions of the armature windings. Each commutating circuit 4 detects the polarity of the field magnet 10 directly opposite thereof, thereby determining and controlling the direction of the electric current to be fed to the respective armature winding to cause rotation of the rotor consisting of the rotating shaft 8 and the annular yoke 9 with respect to the armature windings according to Fleming's left-hand rule.

Figures 3, 4:
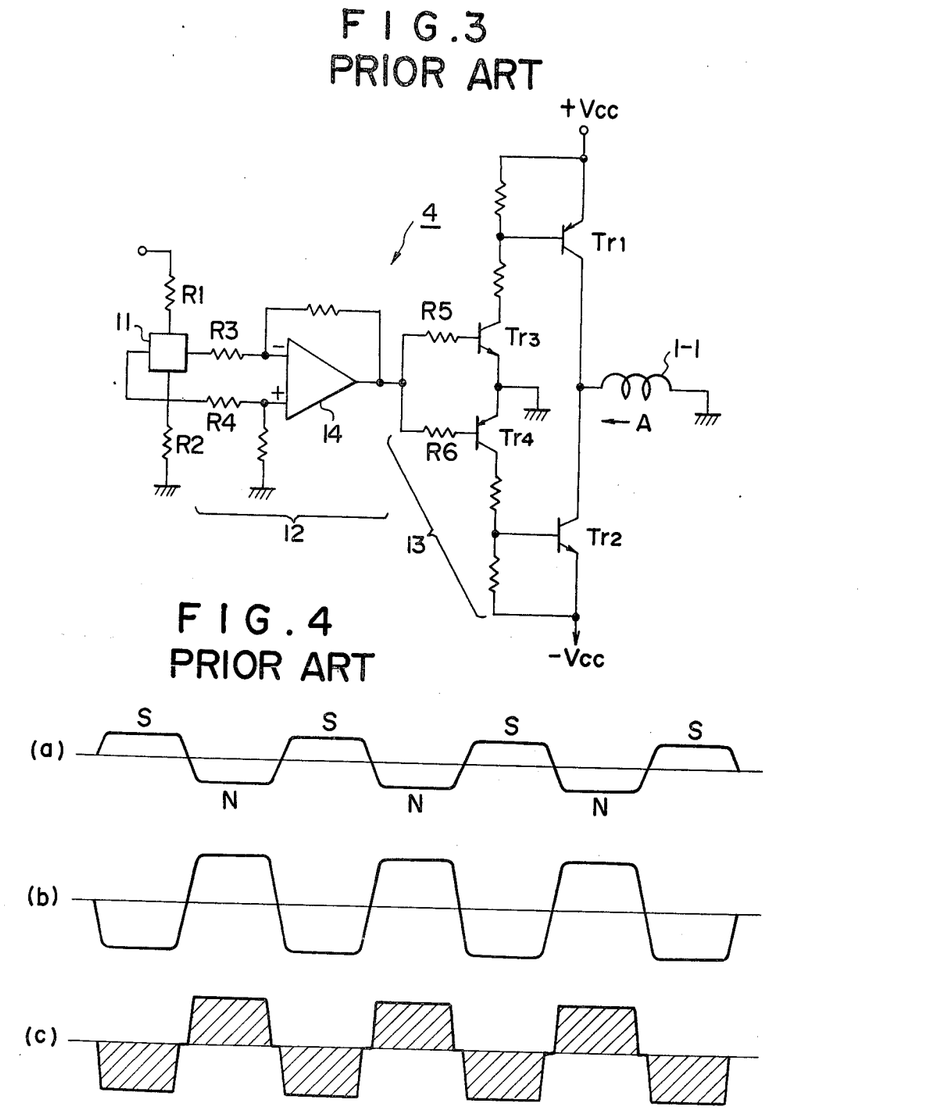
FIG. 3 is a circuit diagram showing in more detail connection of an armature winding shown in FIG. 2.
FIG. 4 shows the output wave forms observed at various points in the circuit diagram shown in FIG. 3.

As shown in FIG 3, each commutating circuit 4 includes a Hall sensor 11 having four terminals connected thereto. Each Hall sensor is located in the interior of a respective armature winding 1 and corresponds to a respective commutating circuit 4. Consequently, each Hall sensor detects the polarity of the field magnet 10 directly opposite thereto and whereby each respective commutating circuit 4 controls the direction of the electric current to be fed to each respective armature winding. The Hall sensor 11 is connected between a pair of resistors R1 and R2. The output of the Hall sensor 11 has a wave form shown in FIG. 4-a. An inverse operational amplifier 12 amplifies the output voltage of the Hall sensor 11. The wave form of the output of the amplifier 12 is shown in FIG. 4-b. The output of the amplifier 12 is inputed into a current amplifier 13 the output of which has a wave form shown in FIG. 4-c.

When the Hall sensor 11 is opposite to a S pole field magnet 10, the output voltage of the Hall sensor 11 is inputed into an operational amplifier 14 of the inverse amplifier 12 through a resistor R3 and is amplified thereby to turn on transistor Tr4 by way of a resistor R6, which causes transistor Tr2 to turn on. (At this time, transistors Tr1 and Tr3 are in the off-state.) Accordingly, an electric current flows through the armature winding 1-1 in the direction of the arrow A.

On the other hand, when the Hall sensor 11 is opposite to a N pole, the output voltage of the Hall sensor 11 is inputed into the operational amplifier 14 through a resistor R4. The output of the operational amplifier 14 turns on transistor Tr3 by way of a resistor R5, which causes transistor Tr1 to turn on. (At this time, the transistors Tr2 and Tr4 are in the off-state.) Accordingly, an electric current flows through the armature winding 1-1 in the direction opposite to the arrow A. The respective transistor pairs Tr1, Tr3 and Tr2, Tr4 amplify the electric currents passing therethrough.

Again in FIG. 2, assuming that the Hall sensors 11 in the commutating circuits 4-1 to 4-4 are situated opposite to N poles, which as previously described causes transistor Tr1 of each commutating circuit to be turned on, and that the Hall sensors 11 in the commutating circuit 4-5 to 4-8 are situated opposite to S poles, which causes transistor Tr2 of each commutating circuit to be turned on, an electric current from the armature windings 1-1 to 1-4 flows into the armature windings 1-5 to 1-8. However, in the case of conventional brushless motor where the armature windings 1-1 to 1-8 are connected to each other in the manner shown in FIG. 2, the electric potentials at the junction points 16-1 to 16-4 are equal to each other, and therefore an electric current does not flow through the armature windings 1-2, 1-3 and 1-4 when a counter electromotive force is generated. Similarly, the electric potentials at the junction points 16-5 to 16-8 are equal to each other and therefore an electric current does not flow through the armature windings 1-6, 1-7 and 1-8. In other words, the electric current only flows through two windings 1-1 and 1-5 each of which is connected between two junction points between which a potential difference exists, i.e., between the junction points 16-1 and 16-8 and between the junction points 16-4 and 16-5 respectively. Thus in the electric circuit of a conventional brushless motor shown in FIG. 2, only two armature windings in eight armature windings can contribute to producing torque at any given time. Further, if the number of armature windings is increased in order to produce a larger torque, then the number of armature windings which are not simultaneously energized will also be increased. Thus, in the brushless motor shown in FIG. 5 wherein sixteen armature windings are employed, only four armature windings are energized at any given time which limits the amount of torque that can be produced.

The present invention mainly relates to an improved system of connecting the armature windings which is able to simultaneously energize a relatively large number of armature windings as compared to the conventional connection described above, thereby producing a larger torque. The improved connecting system of the present invention is particularly suitable for brushless motors having a large number of armature windings, e.g., an axially flat type brushless motor having a pair of armature windings or a brushless motor of the type having a large number of armature windings with at least two windings being disposed in a radial direction, the latter being a novel type which the inventor of the present invention has previously invented. With the improved connecting system of the windings in accordance with the present invention, the number of the armature windings which do not contribute to producing torque is very small, if any.

Figure 8:
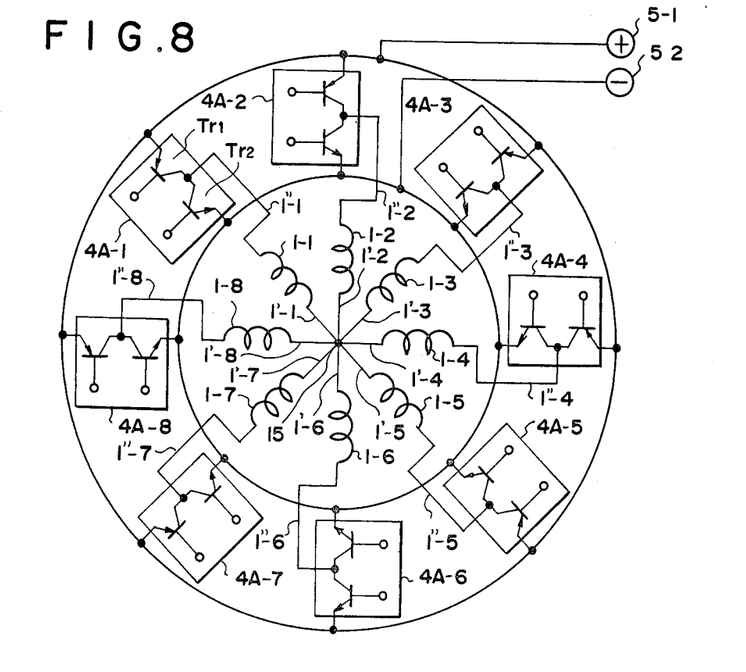
FIG. 8 is a schematic view showing the connection of eight armature windings according to an embodiment of the present invention.

Now referring to FIG. 8, a brushless motor in accordance with an embodiment of the present invention will be described. FIG. 8 shows the electric circuit of the brushless motor of this embodiment. In this embodiment the mechanical arrangement shown in FIG. 5 is employed with the field magnet shown in FIG. 6. Namely, the brushless motor of this embodiment is an axially flat type brushless motor having ten poles and eight armature windings.

Figure 9:
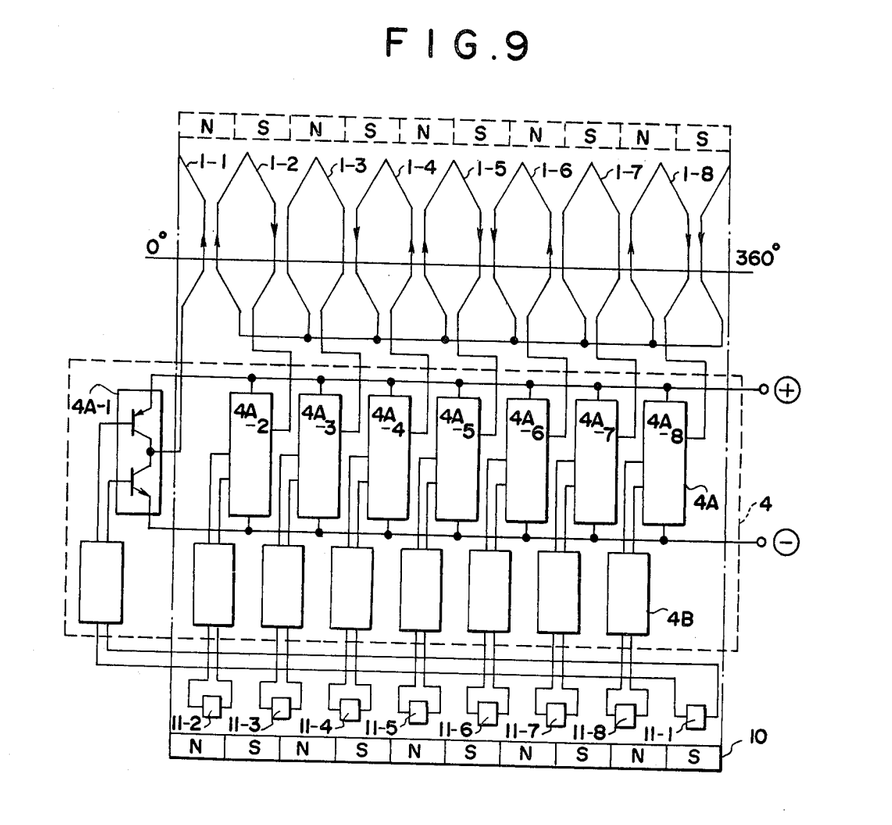
FIG. 9 is a layout schematic plan view of the connection shown in FIG. 8 related to a field magnet having ten poles.

As shown in FIG. 8, the eight armature windings 1-1 to 1-8 are connected together at one end 1'-1 to 1'-8 thereof as indicated at 15 and are connected to commutating circuits 4A-1 to 4A-8 at the other ends thereof 1"-1 to 1"-8, respectively. Each commutating circuit is the same type as one shown in FIG. 3. FIG. 9 is a layout plan of the circuitry of FIG. 8 with respect to the commutating circuits 4A-1 to 4A-8 and the magnetic poles of the field magnet 10.

When the field magnet 10 is in the position shown in FIG. 9 with respect to the armature windings 1-1 to 1-8, all the armature windings are energized except for windings 1-3 and 1-7 which are connected to respective commutating circuits 4A-3 and 4A-7 having respective Hall sensors 11-3 and 11-7 which are located just between a S pole and a N pole. For example, the transistor Tr2 of the commutating circuit 4A-1 is turned on since the Hall sensor 11-1 thereof is located opposite to a S pole, thereby causing an electric current to flow from the end 1''-1 into the armature winding 1-1 and then into the armature winding 1-5 through the junction point 15. Similarly, the transistor Tr1 of the commutating circuit 4A-2 is turned on which causes armature windings 1-2 and 1-6 to be energized. However, transistor Tr1 of commutating circuit 4A-3 is not turned on since the Hall sensor 11-3 thereof is located just between a S pole and a N pole and therefore does not give any output. Accordingly an electric current does not flow through the armature winding 1-3 and therefore does not flow through the armature winding 1-7. When the armature winding 1-4 is energized, the armature winding 1-8 is also energized. In FIG. 9, the push-pull circuit consisting of the transistors Tr1 and Tr2 and the remaining parts of each commutating circuit are separately shown as indicated by 4A and 4B, respectively.

Figure 10:
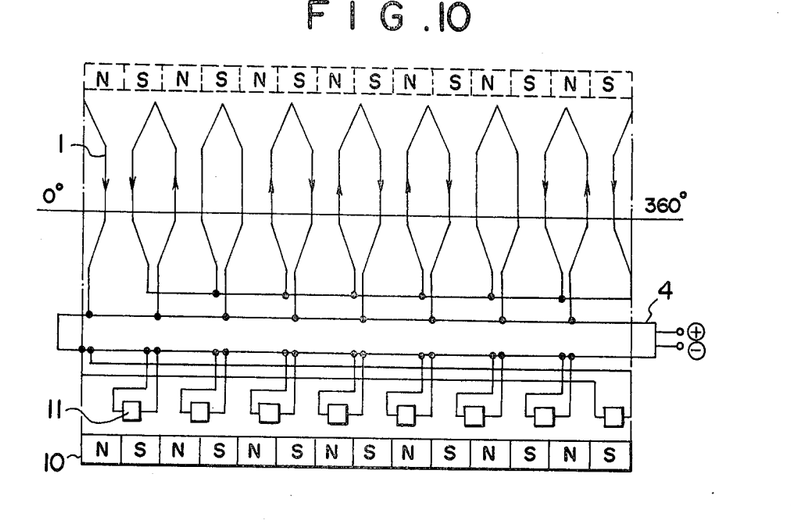
FIG. 10 is a layout schematic plan view of the connection of the eight armature windings in accordance with another embodiment of the present invention in which the connection is related to a field magnet having fourteen poles.

FIG. 10 is a development of an electric circuit similar to that at FIG. 9 for the case of a brushless motor in accordance with another embodiment of the present invention having eight armature windings and a field magnet having fourteen magnetic poles. The operational principle of this circuit is similar to that described for FIG. 9 and accordingly will not be described here. The motor having eight armature windings is not limited only to eight-phase motors, but may be used in four-phase motors or two-phase motors. Accordingly, it is convenient to have an odd number of the armature windings so that the number of phases of the motor is inherently equal to the number of the armature windings.

Figure 11:
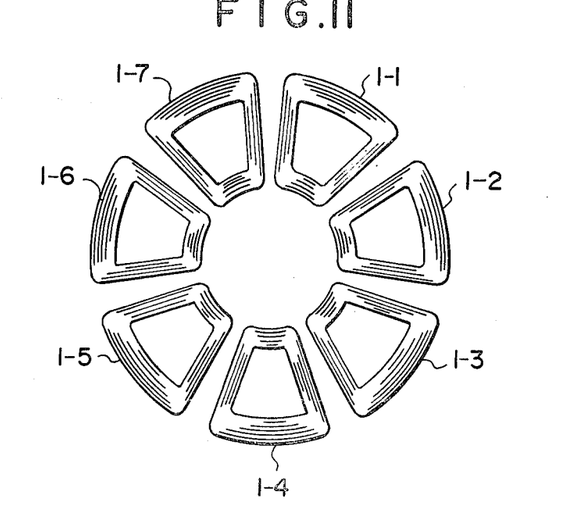
FIG. 11 is a schematic plan view showing an arrangement of seven armature windings.
Figure 12:
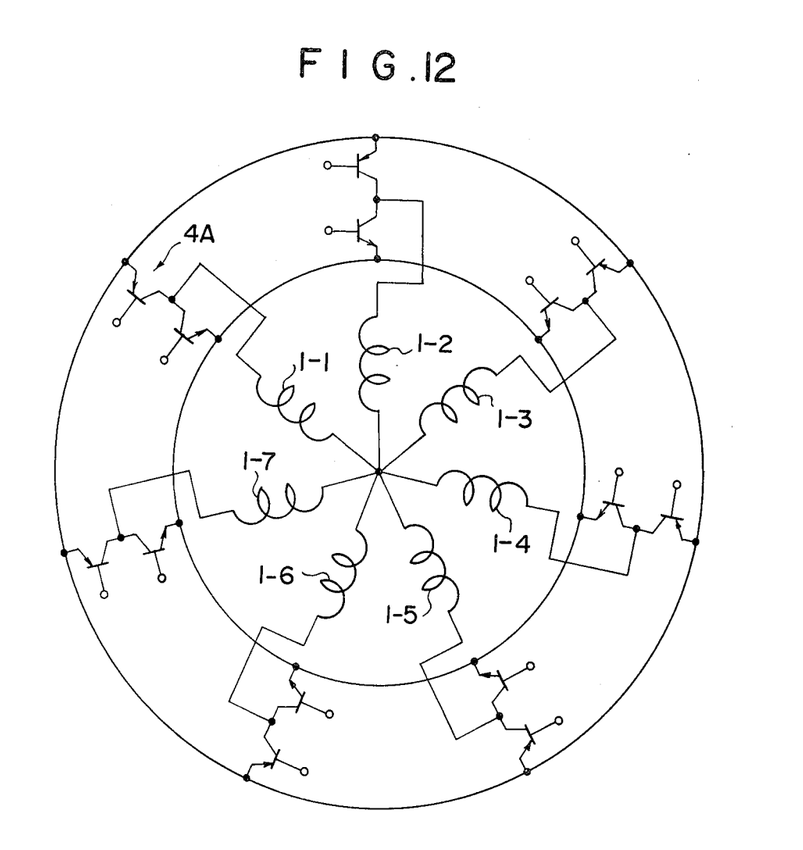
FIG. 12 is a schematic view showing the connection of seven armature windings in accordance with still another embodiment of the present invention.
Figure 13:
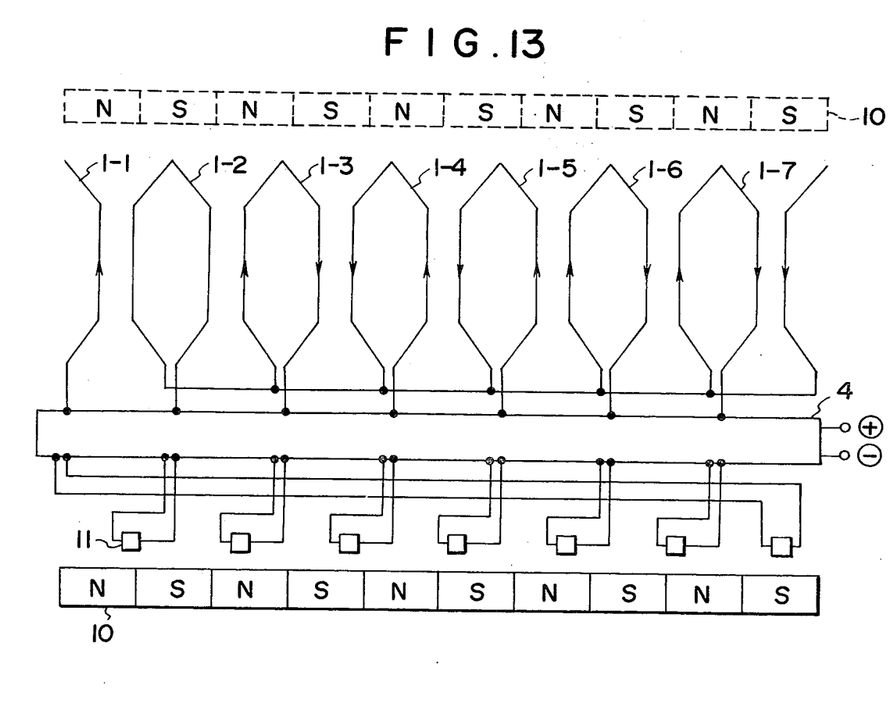
FIG. 13 is a layout schematic view of the connection shown in FIG. 12 related to a field magnet having ten poles.

FIG. 11 shows an arrangement of the armature windings for the case of seven armature windings. Again in FIG. 11, the armature windings 1-1 to 1-7 are equally spaced from each other so as not to overlap one another, and the conductor portions of each armature winding which are utilized for producing torque are formed therein at an angle substantially equal to the angles of the magnetic fields of the field magnets. FIG. 12 shows a connection of the seven armature windings shown in FIG. 11 according to another embodiment of the present invention. FIG. 13 is a layout plan of the connection shown in FIG. 12 similar to FIG. 9. In connection of FIG. 12, all the armature windings except one (the armature winding 1-2 in the state shown in FIG. 13) are simultaneously energized. If the seven armature windings are connected in a manner similar to the manner shown in FIG. 2, only two of the windings would be simultaneously energized at any given time. When the connecting system of FIG. 12 is employed in a brushless motor similar to the one shown in FIG. 5 where the number of the armature windings is changed to fourteen or seven or either side, only two of the windings are not simultaneously energized. In this case, an effective fourteen-phase brushless motor can be obtained. When the number of the armature winding is seven, a field magnet having ten or twelve magnetic poles may be used.

The present invention can be applied to any brushless motor other than the axially flat type brushless motors described above. For example the present invention can be applied to cup-type brushless motors. Further, it is not necessary that the armature windings are arranged so as not to overlap each other, and it is not necessary that the conductor portions of each armature windings which are utilized for producing torque form an angle substantially equal to the angle of the magnetic fields of the field magnets.

It will be noted that the above-described electric motor can be used in any field. Particularly in an image scanning system, the electric motor is useful in feeding or moving an image recording or bearing medium in the subscanning direction perpendicular to the main-scanning direction. The image recording or bearing medium is moved at a constant speed in the sub-scanning direction in an image scanning system for an image recording or read-out system. As is well known in the art, the image scanning system for an image recording or read-out system employs a main scanning means for scanning an image recording or bearing medium at a high speed repeatedly in one direction and a sub-scanning means for scanning the medium at a comparatively low speed in a direction perpendicular to said main scanning direction. In the sub-scanning means, a motor is often used to feed the medium at a constant speed. The electric motor in accordance with the present invention can advantageously be used in the above-mentioned image scanning system.

I claim:

1. A brushless motor comprising seven or more armature windings mounted on a stator, field magnets mounted on a rotating shaft to rotate therewith with respect to the armature windings, a plurality of semiconductor commutating devices each being connected to one of the armature windings and having position detecting elements which detect the polarity of the field magnet directly opposite to each armature winding, said each commutating device controlling the direction of the electric current to be fed to a respective armature winding according to the polarity detected by a respective position detecting element, characterized in that said armature windings are connected together at one end thereof and are connected to a respective commutating device at the other end thereof whereby the motor simultaneously energizes a majority of the armature windings thereby enhancing the produced torque.

2. A brushless motor as defined in claim 1 in which each magnetic pole of said field magnet has a fan shape having a defined angle and each of said armature winding is shaped so that the conductor portions thereof utilized for developing torque formed therein has an angle substantially equal to said defined angle of the magnetic pole of the field magnet.

3. A brushless motor as defined in claim 2 in which said armature windings are arranged at equal intervals spaced from each other so as not overlap one another.

4. A brushless motor as defined in claim 3 in which said field magnet has the same number of S poles and N poles alternately formed thereon, the number being not less than five.

* * * * *